United States Patent
Halsey et al.

(10) Patent No.: US 6,677,890 B2
(45) Date of Patent: Jan. 13, 2004

(54) DISTRIBUTED ELEVATED RADAR ANTENNA SYSTEM

(75) Inventors: J. Doss Halsey, Falls Church, VA (US); James Boschma, Huntsville, AL (US)

(73) Assignee: Information System Laboratories, Vienna, VA (US)

( * ) Notice: Subject to any disclaimer, the term of this patent is extended or adjusted under 35 U.S.C. 154(b) by 0 days.

(21) Appl. No.: 10/161,294

(22) Filed: Jun. 3, 2002

(65) Prior Publication Data

US 2003/0222811 A1 Dec. 4, 2003

(51) Int. Cl.⁷ .................................................. G01S 13/05
(52) U.S. Cl. ............................. 342/74; 342/73; 342/77; 342/89; 342/90
(58) Field of Search ............................. 342/73–77, 88, 342/89

(56) References Cited

U.S. PATENT DOCUMENTS

| | | | |
|---|---|---|---|
| 4,728,959 A | 3/1988 | Maloney | |
| 5,583,517 A | 12/1996 | Yokev | |
| 5,596,330 A | 1/1997 | Yokev | |
| 5,955,989 A | * 9/1999 | Li | ............... 342/368 |
| 5,999,131 A | 12/1999 | Sullivan | |
| 6,078,289 A | * 6/2000 | Manoogian et al. | ........ 342/373 |
| 6,313,783 B1 | * 11/2001 | Kuntman et al. | ............. 342/32 |

* cited by examiner

*Primary Examiner*—Thomas H. Tarcza
*Assistant Examiner*—Isam Alsomiri
(74) *Attorney, Agent, or Firm*—Nydegger & Associates

(57) ABSTRACT

An airborne radar antenna system for detecting a target in a volume includes a tethered aerostat and an antenna that is supported above ground by the aerostat. The aerostat-based antenna is used for transmitting and receiving a radar beam into the volume to detect the target. Additionally, the system includes a ground-based transmitter that generates a beacon signal which monitors the antenna configuration at the aerostat. A computer then evaluates the beacon signal to create an error signal which is used to maintain a predetermined configuration for the antenna. The system also includes mechanisms for orienting the radar beam along preselected beam paths between the antenna and the volume.

19 Claims, 1 Drawing Sheet

DISTRIBUTED ELEVATED RADAR ANTENNA SYSTEM

FIELD OF THE INVENTION

The present invention pertains generally to radar antennas. In particular the present invention pertains to ground-based radar systems that incorporate airborne antennas. More particularly the present invention pertains generally, but not exclusively, to target acquisition systems which employ airborne antennas that are supported by aerostats.

BACKGROUND OF THE INVENTION

Several considerations must always be addressed during the design and development of any effective radar system. In particular, and of special concern for the present invention, is the configuration of an antenna that can be used for a ground based radar system, and the way in which it is to be operationally deployed with an aerostat. For this concern, both technical and operational considerations need to be addressed. For example, technical consideration that can affect the target acquisition capability of a radar antenna include its size, its rigidity, its ability to direct a transmitted radar beam along a desired beam path and, of course, its power. Further, important operational considerations involve the location of the antenna, its steerability and, depending on its mission profile, the ease with which it can be set up for deployment and dismantled for subsequent relocation and redeployment.

It happens that target acquisition radar systems require effectively unobstructed line-of-sight beam paths. Thus, radar systems, in general, are adversely affected by "clutter" in the form of unwanted echoes from terrain features and man-made structures in the immediate vicinity of the antenna. Accordingly, for ground-based radar systems, an obvious solution is to somehow elevate the radar antenna.

Towers, or other types of vertical structures, are quite commonly used for the purpose of elevating radar antennas to a location where they can be effective. For situations wherein a relatively high degree of mobility is required, however, it may be more cumbersome and time consuming to erect and dismantle antenna towers than is operationally warranted. In such situations, it has been proposed that an aerostat be used as a platform for the antenna. The use of an aerostat for this purpose, however, introduces additional considerations of antenna weight which would otherwise be of much less concern. For instance, the necessary rigidity for an antenna is typically provided by a structure which, even when made of a relatively lightweight material, still has substantial weight. Also, because transmit apertures for antennas are heavier than their associated receive apertures, it may be desirable to reduce the size, and consequently the weight, of the transmit aperture for an aerostat based antenna. The result of such an antenna configuration is that the transmit beamwidth effectively grows larger (i.e. a "floodlight" beam). Consequently, because target detection probability remains a function of energy on target, there is a diminution in target detection ability.

In light of the above, it is an object of the present invention to provide an airborne radar antenna system for detecting a target in a volume that includes an antenna made of a light weight material, such as printed circuits on a flexible mylar sheet. Another object of the present invention is to provide an airborne radar antenna system for detecting a target in a volume that is capable of effectively using a smaller transmit aperture than its receive aperture. Still another object of the present invention is to provide an airborne radar antenna system for detecting a target in a volume that can be effectively deployed with an inflatable aerostat. Yet another object of the present invention is to provide an airborne radar antenna system for detecting a target in a volume that is easy to use, relatively simple to manufacture, and comparatively cost effective.

SUMMARY OF THE PREFERRED EMBODIMENTS

In accordance with the present invention, an airborne radar antenna system for detecting a target in a volume includes at least one inflatable aerostat, and a same number of tethers that respectively anchor each aerostat to points on the ground. A radar antenna, for transmitting and receiving a radar beam, is supported by each aerostat at respective locations above ground level. It is contemplated for the present invention that the radar antenna is preferably one square meter in size and less than approximately seventy kilograms (70 kg). Importantly, the radar antenna may be made of a flexible material. For example, the antenna can be made of a flexible sheet on which the required antenna elements have been printed. The flexible sheet can then be mounted on a rigid frame which, in turn, is supported by the aerostat. Thus, the antenna can be supported by the aerostat in any of several ways. These include mounting the antenna inside the buoyancy chamber of the aerostat. Alternatively, the antenna can be mounted on the surface of the aerostat's buoyancy chamber or in an enclosure that is suspended beneath the aerostat.

Included in the system of the present invention is a ground-based transmitter that is positioned at a distance from the aerostat. The specific purpose of this transmitter is to radiate a beacon signal toward the antenna at the aerostat. A computer is then used to evaluate the beacon signal as it is received by the antenna for purposes of creating an error signal. Importantly, this error signal is indicative of any deviations or distortions that may be experienced by the flexible antenna from its desired configuration. Accordingly, with this error signal, system mechanisms can then be activated to electronically or mechanically reconfigure or calibrate the antenna element, as necessary, to orient and direct the radar beam along a predetermined beam path toward the volume. Additionally, system mechanisms can be incorporated for rotating or spinning the antenna element to sweep the radar beam through the volume.

Also included in the system of the present invention is a ground station that is established to house the computer and any other subsystems that are required to control the antenna for its target acquisition mission. In order to affect this control, a communications link is provided that connects the computer and other subsystems at the ground station with the antenna at the aerostat. The present invention contemplates that any communication, whether it is a two-way or one-way communication, between the ground station and the antenna, can be established through the communications link. By way of example, DC power from a power source at the ground station can be sent, through the communications link, and to the antenna for transmitting and receiving a radar beam. Preferably, the communications link is an optical fiber that is incorporated with the tether. The communications link, however, may be a wireless or an optical link of any type known in the pertinent art.

It can happen that for certain applications, it is desirable, or necessary, for the receive aperture of the antenna to be a different size than the antenna's transmit aperture. If so, for instances wherein a first aperture (of area $A_1$) is used for transmitting the radar beam, and a second aperture (of area $A_2$) is used for receiving a return signal from said radar beam, and wherein $A_1=nA_2$ with n>1, the present invention envisions filling the transmitter beam with multiple-simultaneous receive beams and having an appropriately increased dwell time on the return signal for target detection by the receive aperture ($A_2$). Specifically, if "x" seconds are required to detect the target for an antenna configuration wherein the value of "n" is one (n=1), the system of the present invention contemplates increasing the dwell time of the antenna to "nx" seconds for receiving the return. The result is an equivalent volumetric search rate with a reduced transmit aperture resulting in reduced size, weight, and (relative) cost.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
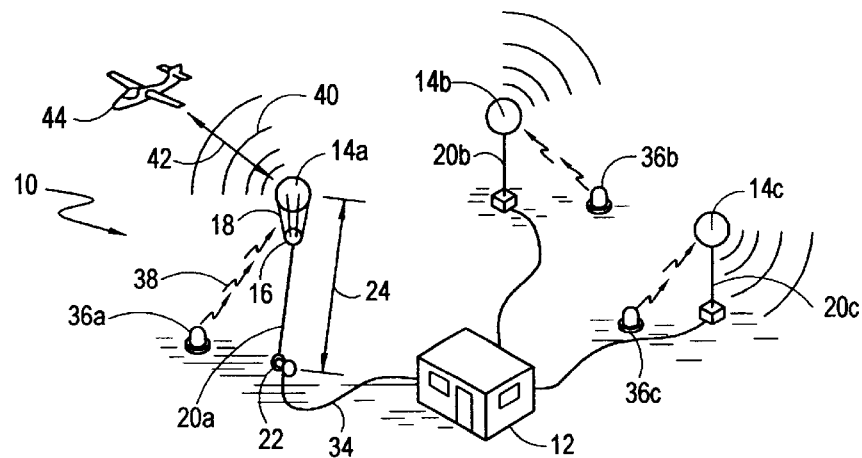
FIG. 1 is a schematic view of the radar system of the present invention showing a typical deployment of the aerostat-based antennas.

Referring initially to FIG. 1, a radar system in accordance with the present invention is shown and is generally designated 10. As shown, the system 10 includes a ground station 12 and a plurality of airborne aerostats, of which the aerostats 14a, b and c are only exemplary. For purposes of the present invention, the ground station 12 can be a fixed installation (as shown), or it can be a mobile facility (e.g. a truck) which is capable of being relocated, if required. In any event, the ground station 12 is intended to manage and command the system 10 as a centralized facility. Insofar as the aerostats 14a, b and c are concerned, they are preferably made of an elastic material which will allow for helium volume changes that occur as a result of temperature and atmospheric pressure changes.

Using the aerostat 14a for purposes of disclosing the system 10 of the present invention, it will be seen that in one contemplated configuration, the aerostat 14 can include an enclosure 16 that is suspended by interconnecting line 18 beneath the aerostat 14a. Further, for all of its possible configurations, the aerostat 14a (via enclosure 16, if used) is preferably anchored to the ground by a tether 20a. More specifically, a ground-based mechanism, such as a winch 22, is used to vary the length of the tether 20a and thereby adjust the distance 24 at which the aerostat 14a is elevated above ground level. Typically, the distance 24 can be varied from around twenty feet to around five hundred feet (20–500 ft.). Alternatively, it is recognized that higher altitude aerostats are capable of operations at 10,000 ft. and higher.

Figure 2:
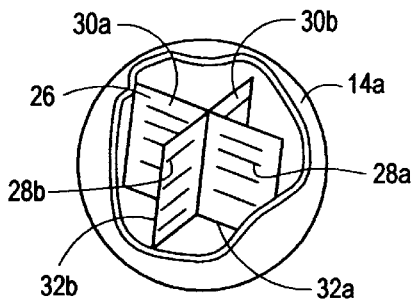
FIG. 2 is a view of an embodiment of an aerostat as used for the present invention with portions broken away for clarity.

Referring now to FIG. 2 it can be seen that the present invention envisions mounting antennas 26 inside the respective aerostats 14a, b and c. It should be noted, however, that the present invention also envisions mounting the antennas 26 inside respective enclosures 16, if used. As also envisioned by the present invention, in order to minimize weight requirements the antennas 26 will each include printed circuits 28 which are printed on flexible panels 30 that are mounted on frames 32. The overall weight for each of the antennas 26 of the present invention is envisioned to be less than approximately seventy kilograms (70 kg). Further, as shown in FIG. 2, in order to increase the directional capability of the antenna 26, the present invention contemplates the use of two panels 30a and 30b, with respective printed circuits 28a and 28b mounted on respective frames 32a and 32b, which are oriented substantially perpendicular to each other.

Referring back to FIG. 1, it is seen that a communications link 34 connects the antenna 26 of the system 10 to the ground station 12. Preferably, the communications link 34 is an optical fiber which is incorporated directly into the tether 20. The communications link 34 may, however, be any other type of link well known in the pertinent art that is useful for connecting a radar antenna 26 to a ground station 12, such as a wireless communications link.

It is important to note that any communication, whether it is a two-way or a one-way communication, between the antenna 26 and the ground station 12 can be accomplished through the communications link 34. For example, the present invention can include a camera means that is attached to the aerostat 14 and is in electronic communication with the antenna 26. A radar video of the target 44 that is captured by the camera means can be then sent from the antenna 26, through the communications link 34, to a video display monitor at ground station 12. Another example is that DC power generated by a power source at the ground station 12 can be sent through the communications link 34 and up the tether 20 to the antenna 26 for any desired purposes, such as to operate the camera means.

Still referring to FIG. 1, it is seen that the system 10 also includes a ground-based beacon 36 which is used to provide a reference for electronically calibrating the printed circuits 28. The purpose here would be to establish an effective array for the antenna 26. Specifically, each aerostat 14a, b and c can have a respective beacon 36a, b or c positioned on the ground near the aerostat 14 to radiate a beacon signal 38 to the antenna 26. This beacon signal 38 can then be passed via the communications link 34 to the ground station 12 where it will be processed for the purposes stated above.

Figure 3:
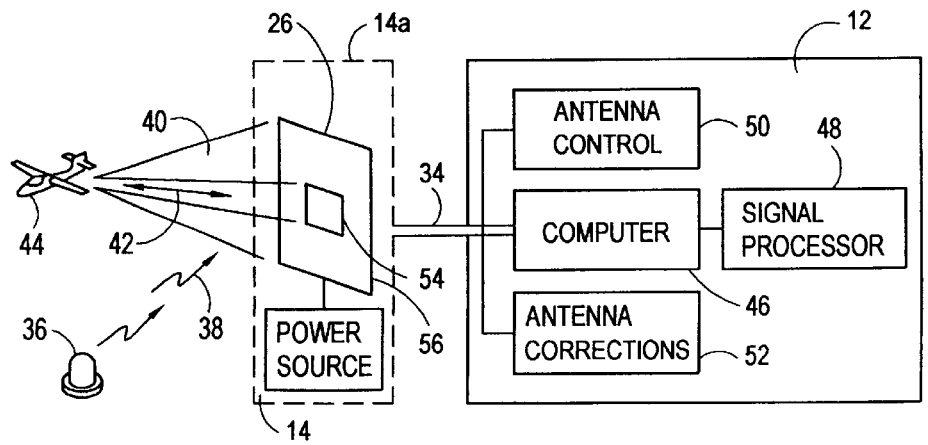
FIG. 3 is a schematic view of the electronic components used for the operation of the present invention.

The general intention of the system 10 is to locate, and elevate an antenna 26 at a selected ground location, or to otherwise establish a distribution of such elevated antennas 26. In either case, the purpose is to radiate a radar beam 40 along a predetermined beam path 42 to detect a target 44. As implied above, the control of this operation is accomplished at the ground station 12. In FIG. 3, a general layout of the system 10 is presented which shows that centralized control of the antenna 26 is provided at the ground station 12. Specifically, this control relies on a computer 46 which operates in concert with a signal processor 48. Further, as also indicated in FIG. 3, internal communications between the computer 46, an antenna control 50, and an antenna corrections function 52 at the ground station 12 provide for necessary operational reconfigurations of the antenna 26.

In order to comply with weight restrictions for an aerostat based radar antenna 26, it may be desirable to reduce the size of the transmit aperture 54 of the antenna 26 relative to its receive aperture 56. If so, for a situation wherein the antenna 26 establishes an aperture (of area $A_1$) for transmitting the radar beam 40 (i.e. aperture 54), and an aperture (of area $A_2$) for receiving a return signal from the radar beam 40 (i.e. aperture 56), and wherein $A_1=nA_2$ with n>1, the transmitter beam is filled with multiple-simultaneous receive beams and the dwell time of the antenna 26 can be appropriately adjusted. Specifically, if "x" seconds are required to detect the target 44 when n=1, the system 10 of the present invention envisions increasing the dwell time of the antenna 26 to "nx" seconds for receiving the return when n>1. For example, if one second is required to detect target 44 when n=1, two seconds will be required to detect target 44 when n=2 and $A_1$ is twice the size of $A_2$.

While the particular Distributed Elevated Radar Antenna System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An airborne radar antenna system for detecting a target in a volume which comprises:
    an aerostat;
    a tether attached to said aerostat for anchoring said aerostat to a point on the ground;
    an antenna for transmitting and receiving a radar beam, said antenna being supported by said aerostat at a location above ground level;
    a means for radiating a beacon signal between said antenna and a ground-based beacon;
    a computer means for evaluating said beacon signal to create an error signal as said beacon signal is received by said antenna; and
    electronic means for configuring said antenna in response to said error signal to orient said radar beam along a preselected beam path between said antenna and said volume.

2. A system as recited in claim 1 further comprising means for spinning said antenna to sweep said radar beam through said volume.

3. A system as recited in claim 1 wherein said aerostat includes a buoyancy chamber and wherein said antenna is mounted inside said chamber of said aerostat.

4. A system as recited in claim 1 wherein said antenna comprises:
    a flexible sheet;
    a plurality of antenna elements printed on said flexible sheet; and
    means for rigidly mounting said flexible sheet on said aerostat.

5. A system as recited in claim 1 wherein said tether has a first end and a second end, with said first end fixed to said point at ground level and wherein said system further comprises:
    a plurality of interconnecting lines attached between said aerostat and said second end of said tether to secure said aerostat thereto; and
    an enclosure attached to said second end of said tether with said antenna mounted inside said enclosure.

6. A system as recited in claim 1 further comprising:
    a ground station with said computer means and said electronic means positioned at said ground station; and
    a communications link connecting said computer means and said electronic means at said ground station with said antenna at said aerostat.

7. A system as recited in claim 6 wherein said communications link is an optical fiber.

8. A system as recited in claim 1 wherein said antenna establishes a transmit aperture (of area $A_1$) for transmitting said radar beam and a receive aperture (of area $A_2$) for receiving multiple-simultaneous receive beams covering the volume from said radar beam, wherein $A_1$ is related to $A_2$ by the expression $A_1=nA_2$ where "n" is a number greater than 1 (n>1), and wherein "x" seconds are required to detect said target when n=1, said system further comprises means for increasing a dwell time of said antenna to "nx" seconds for receiving said receive beams to keep a same volumetric search rate.

9. A system as recited in claim 1 further comprising a plurality of said aerostats.

10. An airborne radar antenna system for detecting a target in a volume which comprises:
    an inflatable buoyancy chamber;
    a support means attached to said buoyancy chamber;
    a flexible printed circuit radar antenna with a power source, mounted on said support means for transmitting and receiving a radar beam;
    a means for selectively positioning said buoyancy chamber at a predetermined location above ground level;
    a ground-based transmitter for radiating a beacon signal toward said antenna for receipt by said antenna;
    a computer means for evaluating said beacon signal to create an error signal as said beacon signal is received by said antenna;
    electronic means for configuring said antenna in response to said error signal to orient said radar beam along a preselected beam path between said antenna and said volume; and
    a means for spinning said antenna to sweep said radar beam through said volume for detection of said target.

11. A system as recited in claim 10 wherein said positioning means comprises:
    a tether attached to said buoyancy chamber for anchoring said buoyancy chamber to a point on the ground; and
    a winch positioned at said point on the ground, said winch being operable to vary a length of said tether between said buoyancy chamber and said point on the ground.

12. A system as recited in claim 11 further comprising:
    a ground station with said computer means and said electronic means positioned at said ground station; and
    a communications link connecting said computer means and said electronic means at said ground station with said antenna at said buoyancy chamber.

13. A system as recited in claim 12 wherein said communications link is an optical fiber attached to said tether.

14. A system as recited in claim 10 wherein said support means is mounted inside said buoyancy chamber.

15. A system as recited in claim 10 wherein said antenna establishes a transmit aperture (of area $A_1$) for transmitting said radar beam and a receive aperture (of area $A_2$) for receiving multiple-simultaneous receive beams covering the volume from said radar beam, wherein $A_1$ is related to $A_2$ by the expression $A_1=nA_2$ where "n" is a number greater than 1 (n>1), and wherein "x" seconds are required to detect said target when n=1, said system further comprises means for increasing a dwell time of said antenna to "nx" seconds for receiving said receive beams to keep a same volumetric search rate.

16. A method for employing an airborne radar antenna system to detect a target in a volume which comprises the steps of:

inflating an aerostat;

anchoring said aerostat to a point on the ground;

supporting an antenna with said aerostat at a location above ground level for transmitting and receiving a radar beam;

radiating a beacon signal from a ground-based transmitter toward said antenna for receipt by said antenna;

using a computer to evaluate said beacon signal to create an error signal as said beacon signal is received by said antenna; and electronically reconfiguring said antenna in response to said error signal to orient said radar beam along a preselected beam path between said antenna and said volume.

17. A method as recited in claim 16 further comprising the step of spinning said antenna to sweep said radar beam through said volume.

18. A method as recited in claim 17 wherein said antenna establishes a transmit aperture (of area $A_1$) for transmitting said radar beam and a receive aperture (of area $A_2$) for receiving multiple-simultaneous receive beams covering the volume from said radar beam, wherein $A_1$ is related to $A_2$ by the expression $A_1=nA_2$ where "n" is a number greater than 1 (n>1), and wherein "x" seconds are required to detect said target when n=1, and wherein said method further comprises the step of increasing a dwell time of said antenna to "nx" seconds for receiving said receive beams to keep a same volumetric search rate.

19. A method as recited in claim 16 further comprising the step of employing a plurality of said aerostats.

* * * * *